United States Patent [19]
Doria et al.

[11] 3,962,091
[45] June 8, 1976

[54] ROTARY DRUM FILTER WITH WIRE DECK, APPARATUS AND METHOD

[75] Inventors: Frank S. Doria, Easton, Pa.; Victor A. Schinnerl, Norwalk, Conn.

[73] Assignee: Dorr-Oliver Incorporated, Stamford, Conn.

[22] Filed: June 11, 1974

[21] Appl. No.: 478,220

Related U.S. Application Data

[63] Continuation of Ser. No. 321,099, Jan. 4, 1973, abandoned.

[52] U.S. Cl. .............. 210/232; 29/163.5 F; 210/402
[51] Int. Cl.² .................... B01D 39/10; B01D 33/06
[58] Field of Search ............ 210/232, 401, 402; 162/357; 140/102, 93; 24/135; 29/163.5, 401.7

[56] References Cited
UNITED STATES PATENTS

| | | |
|---|---|---|
| 1,327,962 | 1/1920 | Pettis .................................. 210/402 |
| 2,308,290 | 1/1943 | Linton ............................... 24/135 X |
| 2,547,601 | 4/1951 | Schreiber ............................ 24/135 |
| 2,551,636 | 5/1951 | Ratigan ............................ 24/135 X |
| 3,268,965 | 8/1966 | Arthur ................................ 24/135 |
| 3,515,281 | 6/1970 | Vore et al. ......................... 210/402 |
| 3,544,955 | 12/1970 | Ruiz .................................... 24/135 |
| 3,829,825 | 8/1974 | Hawkins ............................. 24/135 |

*Primary Examiner*—Theodore A. Granger
*Attorney, Agent, or Firm*—Burtsell J. Kearns; Theodore M. Jablon

[57] ABSTRACT

In rotary drum filters wherein the filter drum has a wirewound deck providing support for the surrounding filter media, a novel method and system of tension winding and securing the deck wire with the aid of improved anchoring means for non-slidably yet detachably securing the wire at predetermined points along the length of the drum, whereby creeping and loosening of the wire windings is obviated. This also permits simplifying and speeding up the winding operation, as well as the replacement of individual wire sections between anchoring points.

19 Claims, 19 Drawing Figures

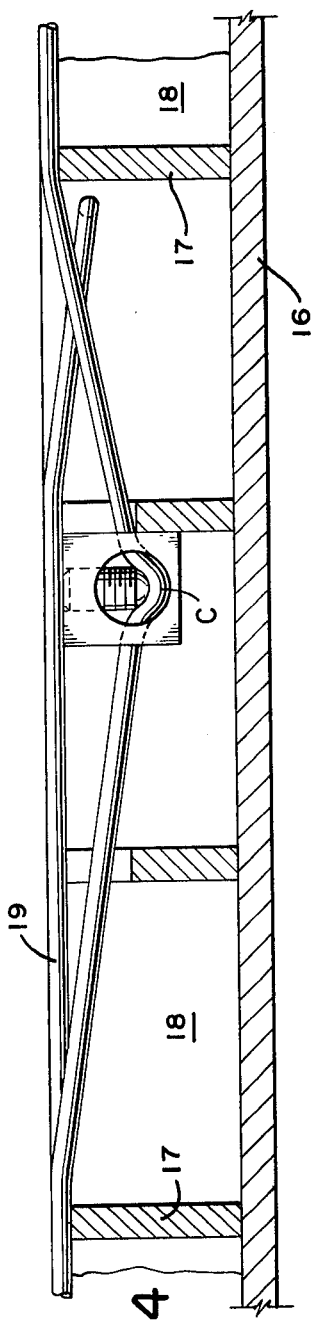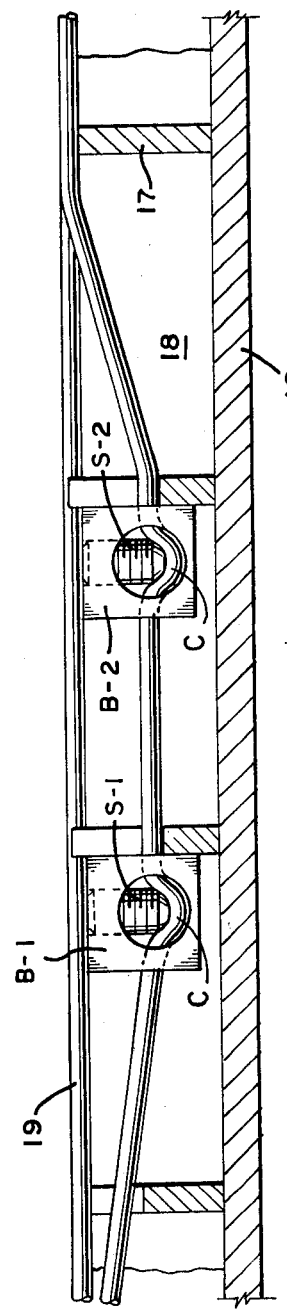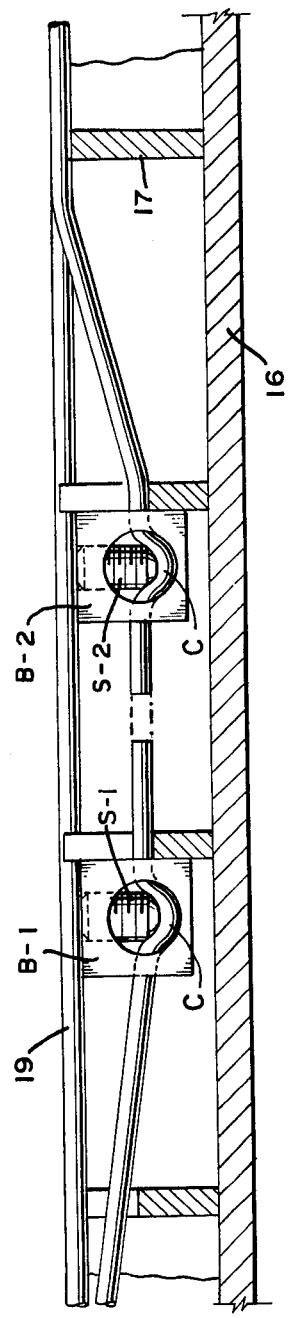

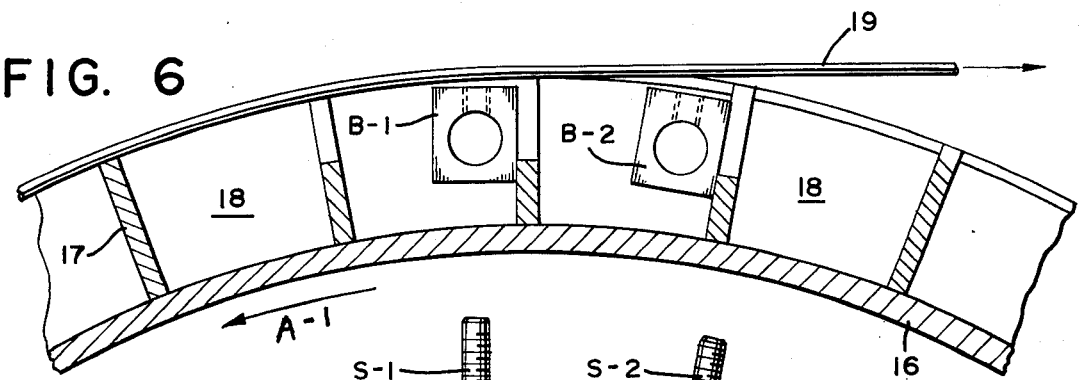
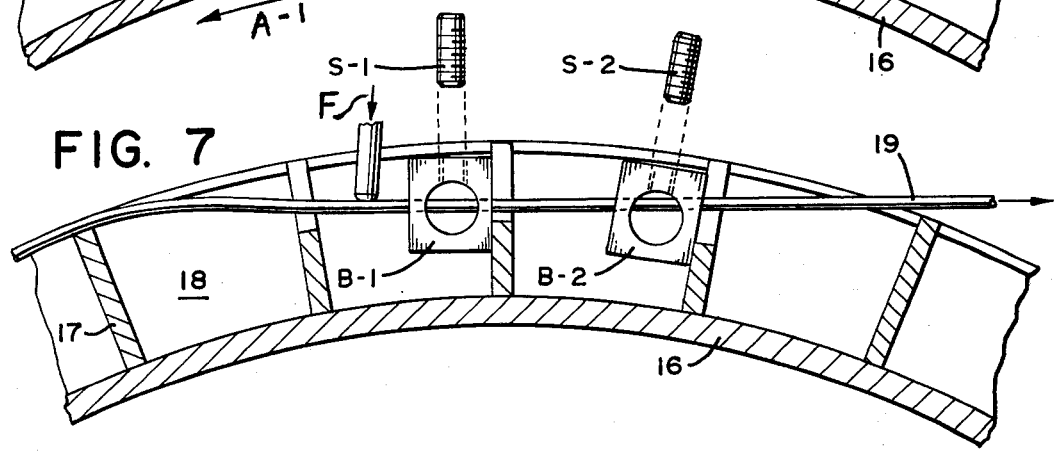
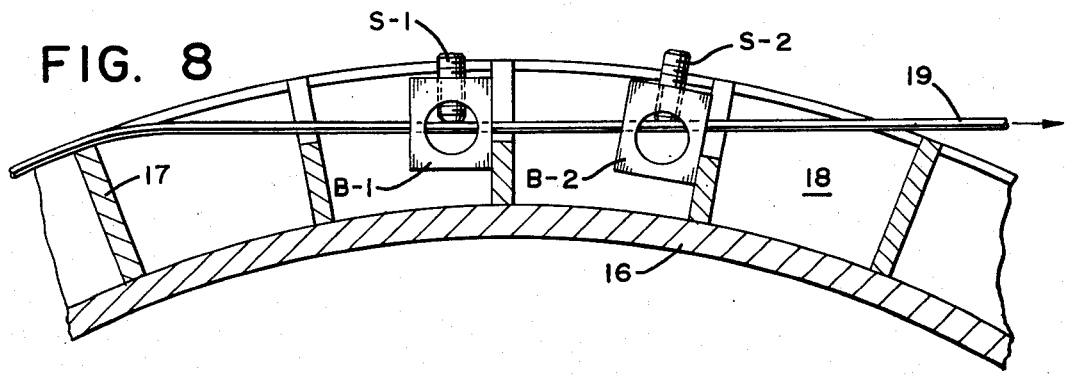
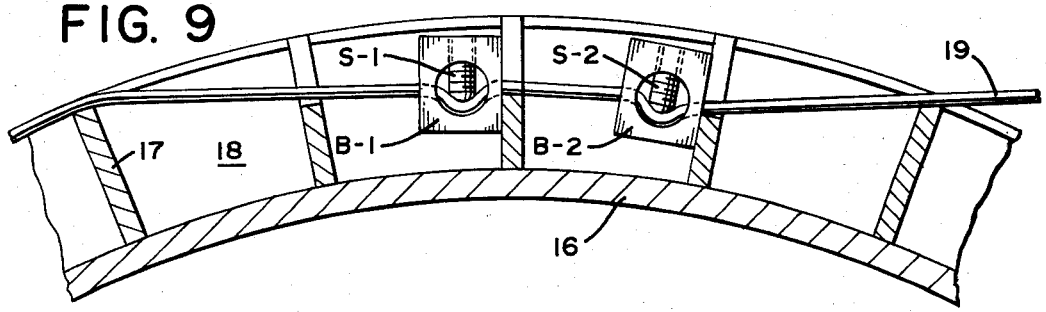

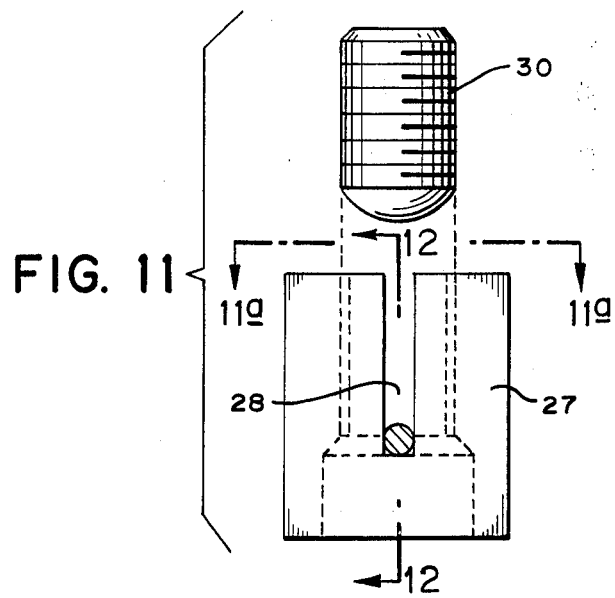
FIG. 11
FIG. 11a
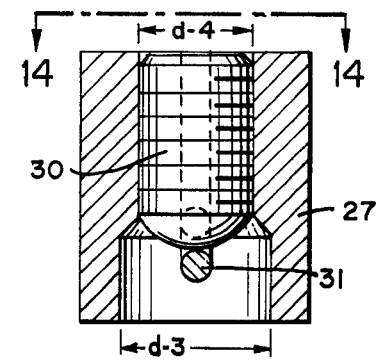
FIG. 13
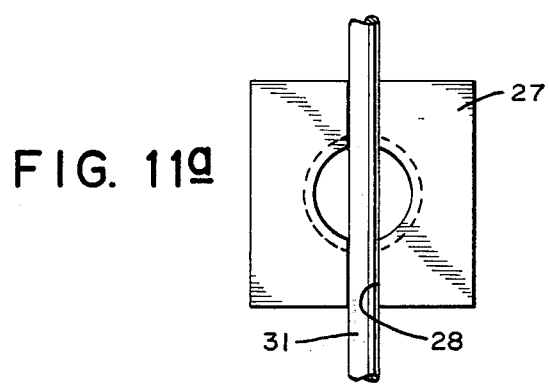
FIG. 12
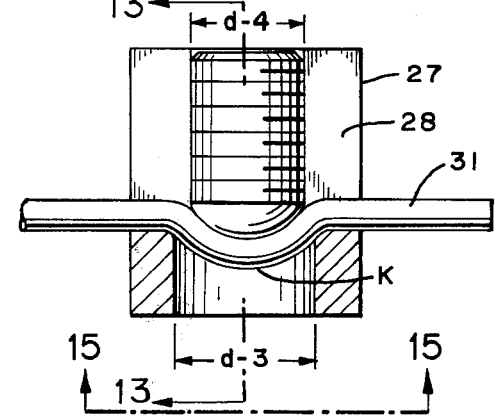
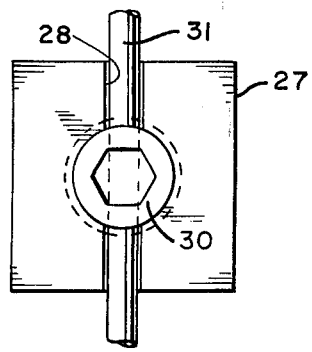
FIG. 14
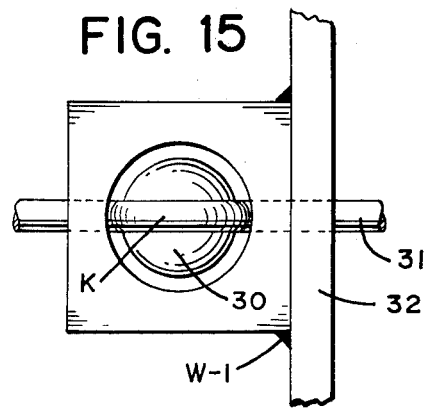
FIG. 15

ROTARY DRUM FILTER WITH WIRE DECK, APPARATUS AND METHOD

This is a continuation, of application Ser. No. 321,099, filed Jan. 4, 1973, now abandoned.

This invention concerns apparatus and method related to continuously operating rotary drum filters wherein the filter drum is partially immersed in a bath of pulp supplied to a vat upon which the filter drum is mounted for rotation. The rotating drum continuously delivers a filter cake or mat at the descending side of the filter drum, while filtrate liquid flows from the interior of the drum.

Depending upon conditions such as the type of pulp and the extent to which dewatering thereof is required, or else the minimum amount of residual moisture to be desired in the filter cake or mat, the filter unit may be designed in any known manner for gravity filtration, or vacuum filtration, or for a combination of both.

In vacuum filtration, for example, of paper pulp, in order to achieve a maximum reduction in the residual moisture content of the filter cake or mat before it is subjected to further processing or drying, pressure rolls cooperating with the rotating drum are often provided for the purpose of compressing and thereby further demoisturizing the mat before it is detached from the filter surface as by a discharge roll geared to the rotation of the drum. Additional pressure thus exerted upon the filter cake, may be automatically controlled.

More in particular, this invention relates to the type of drum filter wherein the filter drum has a wire-wound deck providing the support for the surrounding filter media which may be in the nature of a wire mesh for handling fibrous paper pulp or the like.

In this type of drum filter, the deck wire is wound tightly under controlled tension in narrowly spaced windings across a multitude of longitudinal ribs or so-called divider strips equidistantly spaced from one another along the periphery of the cylindrical shell that constitutes the body of the filter drum. These ribs, between them, constitute longitudinal drainage channels for the filtrate liquid. Notches are formed along the top edges of the divider strips, receiving the wire windings at a predetermined pitch.

More particularly, this invention is concerned with a problem encountered in the winding operation whereby the drum is rotated at a predetermined rate relative to the controlled rate at which the wire is advanced along the drum, which relationship determines the winding pitch.

The problem is due to the fact that during the winding operation, a stainless steel wire under controlled tension must be anchored and non-slidably yet detachably secured not only at the ends of the drum, but also at predetermined intermediate points along the length of the drum, in order that creeping of the tensioned wire and eventual loosening of wire windings may be obviated.

One object is to enable the wire winding to be carried out continuously, in the sense that a continuous length of wire can be passed through a sequence of anchoring points at each of which points the wire should be detachably secured against creepage.

However, the anchoring means should also be such as to permit defective sections between any two mutually adjacent anchoring points to be replaced, while maintaining the required wire tension in the deck.

Another object is to provide a simplified wire anchoring system whereby the winding operation can be carried out efficiently and speedily.

Still another object is to provide simple and effective individual wire anchoring devices.

In order to achieve the foregoing objectives, the invention provides anchoring blocks which may be welded to respective ribs, and so constructed that the tensioned wire can be depressed into a deep slot formed by a sawcut in the block, and registering with similar cuts in the associated ribs to accommodate the wire. A set screw in threaded engagement with both the inner faces of the slot may be tightened sufficiently to force the wire into a depression formed in the bottom of the slot. The holding power of the crimp thus formed in the tensioned wire, and confined between the set screw and the curvature of the depression, positively prevents creeping of the wire.

In one embodiment, the anchoring block has a transverse bore penetrating the slot. The axis of the set screw being substantially normal and radial to the axis of the drum, intersects substantially at right angles with the axis of the transverse bore. The location and diameter of the bore are such that a shallow depression is formed in the bottom of the slot, cooperating with the set screw so as to cause the crimping of the wire as an anticreeping means.

According to one feature, the intermediate anchoring points comprise each a pair of the anchoring blocks arranged in sequence in the direction of the associated wire winding, and welded to respective ribs. Cutting the wire between the two blocks at each of two selected mutually adjacent intermediate points, allows the wire section between these points to be removed and replaced.

Other features and advantages will hereinafter appear.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

In The Drawings

FIG. 4 is a cross-sectional view taken on line 4—4 in FIG. 3, showing a side view of a single block terminal anchoring means at the end of the drum.

FIG. 5 is a cross-sectional view taken on line 5—5 in FIG. 3, showing a side view of a twin block anchoring means at one of the intermediate wire anchoring points.

FIG. 5a is a fragmentary detail view of the anchoring means identical to FIG. 5, arranged to illustrate the removal and replacement of a wire section between two mutually adjacent intermediate anchoring points.

FIGS. 6, 7, 8, and 9 are cross-sectional views similar to FIG. 5 illustrating sequential stages of the manipulation involved when fixing the wire at the respective anchoring points during the winding operation.

Figure 10B:
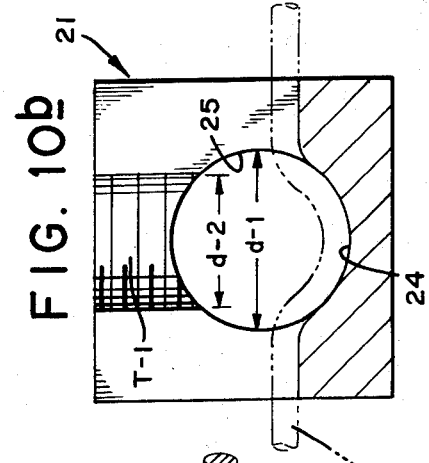
Figure 10:
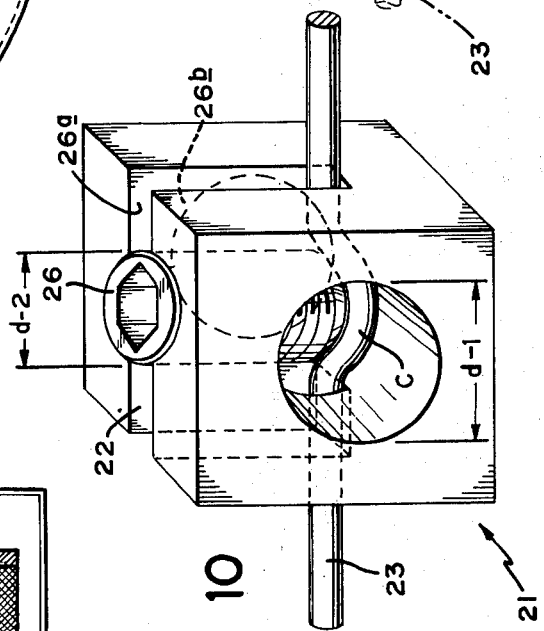

FIG. 10 is a perspective detail view of the anchoring block of this invention.

Figure 10A:
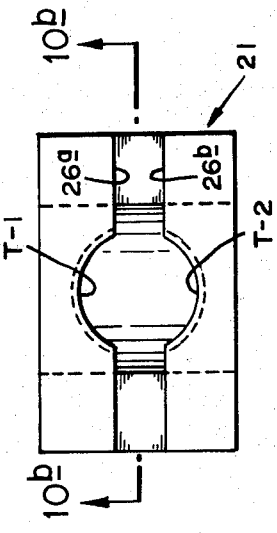

FIG. 10a is a top view of the anchoring block with the set screw removed.

FIG. 10b is a vertical sectional view of the anchoring block, taken on line 10b — 10b of FIG. 10a.

FIGS. 11, 11a, 12, 13, 14, 15 illustrate another wire anchoring block embodying features of the invention.

FIG. 11 is a side view of the block as viewed in the direction of the wire.

FIG. 11a is a top view of the block, taken on line 11a — 11a in FIG. 11, with the set screw about to be applied.

FIG. 12 is a vertical sectional view of the block taken on line 12—12 in FIG. 11, but with the wire and the set screw in place.

FIG. 13 is a vertical sectional view taken on line 13—13 in FIG. 12.

FIG. 14 is a top view taken on line 14—14 in FIG. 12.

FIG. 15 is a bottom view taken on line 15—15 of FIG. 13.

Figure 2:
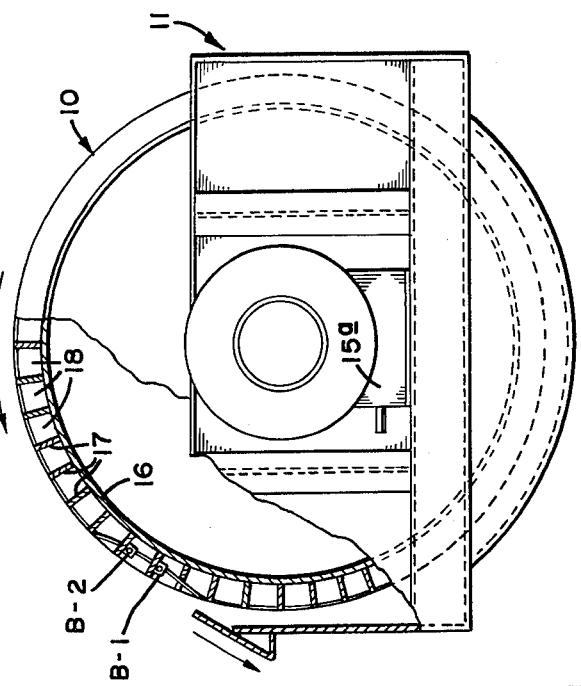
FIG. 2 is a side elevation view of the filter unit with portions broken away to show the improved wire anchoring means at one of the intermediate anchoring points on the filter drum.
Figure 1:
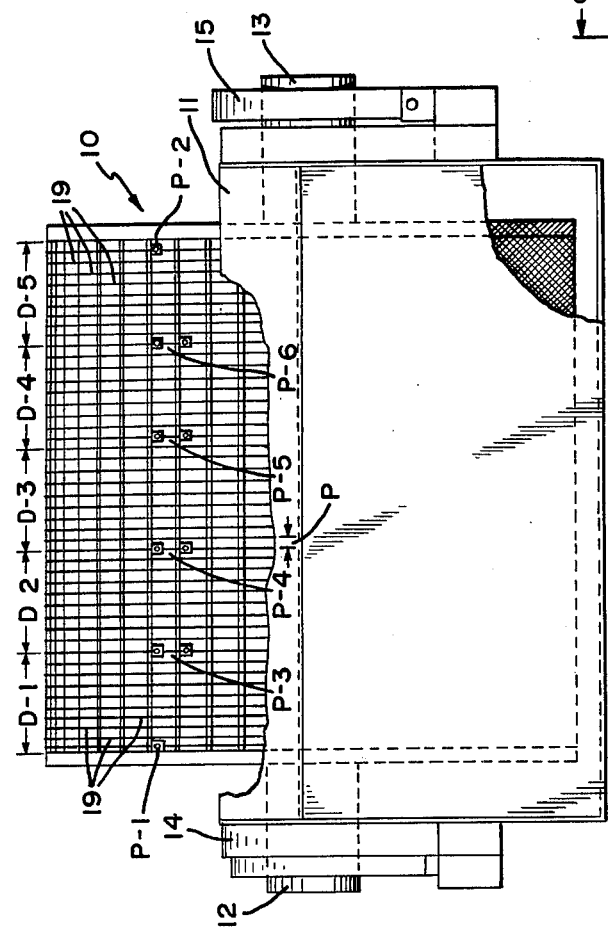
FIG. 1 is a semidiagrammatic longitudinal sectional view of a rotary drum filter indicating the anchoring points in the wire winding of the deck partially exposed by the fragmentary showing of the surrounding filter media.

A rotary drum filter unit of the type embodying the invention, and schematically shown in FIGS. 1 and 2, is of generally known construction. Such a filter unit comprises a filter drum 10 mounted for rotation upon a filter vat 11, as indicated by the end trunnions 12 and 13 of the drum supported in respective bearings 14 and 15 mounted upon the end walls of the vat.

Not shown are the means for supplying feed pulp to the vat, the means for causing the filter cake to be formed on the filter drum, and the means for delivering the filter cake and the filtrate liquid, all being well known in the art. Drive means for the filter drum are indicated at 15a.

The filter drum as herein exemplified, comprises a cylindrical body or shell 16 the ends of which are connected to the aforementioned trunnions. The shell is provided with longitudinal ribs or divider strips 17 extending outwardly from end to end of the shell, constituting the familiar drainage channels 18 for the filtrate liquid.

The wire deck is formed by a deck wire 19 tension wound across the ribs, in narrowly spaced windings, as indicated by the pitch P in FIG. 1. The winding pitch is predetermined due to the wire being received in notches 20 provided along the top edges of the ribs.

Depending upon such factors as the pressure imposed upon the filter media by vacuum, and the pressure from the pressure rolls, for a stainless steel wire of a diameter of 1/8 inch a practical spacing or pitch of the wire windings may be in the order of 1/4 or 1/8 of an inch, while the spacing of the ribs or divider strips may be in the order of 2½ to 3 inches in a filter drum that may be 8 to 10 feet in diameter and 15 to 18 feet in length. Such wire-wound deck presents a substantially perfect cylindrical backing for the filter media surrounding the deck.

Secure anchoring means for the tension-wound deck wire should be provided not only at the ends of the filter drum, but also at an adequate number of intermediate anchoring points along the length of the drum, in order that creeping of the tensioned wire may be obviated. A practical spacing of the anchoring points along the drum is in the order of 12 to 16 inches. Another requirement therefore is that any of the sections of the deck wire between any two mutually adjacent anchoring points, should be removable and replaceable by rewinding it under tension, without affecting or disturbing the tension-wound remainder of the wire deck.

The invention provides novel individual anchoring devices, as well as an anchoring system which permits the winding operation to be carried out in a simplified manner, as well as at a greater speed than has been possible in the past.

The basic arrangement of this anchoring system as exemplified in FIGS. 1 to 5, comprises individual anchoring devices or blocks spaced along the length of the drum. Each such block has a deep sawcut or slot which receives a respective wire winding. When an anchoring point is reached during the winding operation, the tensioned wire is depressed into the slot, and fixed therein by means of a set screw having threaded engagement with both inner sides of the slot. Tightening the set screw will force the wire into a depression formed in the bottom of the slot. The crimp C thus formed in the wire, and confined between the set screw and the curvature of the depression, obviates the creeping of the wire.

Referring now to FIGS. 10, 10a and 10b, a preferred embodiment of the individual anchoring device comprises a block 21 having a slot in the form of a sawcut 22 of substantial depth adapted to receive a wire 23. The bottom of the slot has a curved or convex depression 24 formed by a throughgoing transverse bore 25 penetrating the slot.

In order that the wire may be detachably secured in the slot, there is provided a set screw 26 of the socket type, having threading engagement with both inner sides 26a and 26b of the slot. The screw cooperates with the depression 24, when tightened sufficiently to force the wire to conform to the depression, thereby forming in the wire the aforementioned creep-preventing crimp.

As noted from the sectional detail view of FIG. 10b with the set screw omitted, a depression 24 of suitable configuration relative to the wire to be crimped, is provided by reason of the diameter d-1 of the bore being sufficiently larger than the diameter d-2 of set screw 26.

The plan view of FIG. 10a shows the two component parts or halves T-1 and T-2 of the thread which receives the set screw 26.

According to the embodiment in FIGS. 1 to 5, such an anchoring block may be welded to a respective rib at each end of the drum, providing the end anchoring points P-1 and P-2 of the deck wire (see FIG. 1). Intermediate anchoring points P-3, P-4, P-5 and P-6 are spaced from one another and from the end anchoring points as indicated by distances or winding sections D-1, D-2, D-3, D-4, D-5. Although the deck wire may have been wound in a continuous length through some or all of these winding sections, with the provisions of this invention, each of these wire sections is nevertheless readily replaceable in case of need, as will be presently set forth.

For that purpose, each of the intermediate anchoring points comprises a pair of identical anchoring blocks B-1 and B-2 in series (see FIGS. 1, 3, 4, 5), that is to say, welded to a corresponding pair of mutually adjacent ribs. Thus, with a wire winding extending through these two anchoring blocks, and securely fixed in each of them (see FIGS. 3, 4, and 5), the wire between these two anchoring blocks may be safely cut, as indicated in FIG. 5a, at each end of a wire section to be removed. This wire section is then detached from the anchoring blocks at their respective ends, while all other portions of the wire-wound deck remain unaffected and undisturbed. A replacement wire section in then tension-wound into place by starting with the one anchoring block at one end, and finishing up with the anchoring block at the other end of this wire section.

Detailed Description of the Wire Winding Operation

Figure 3:
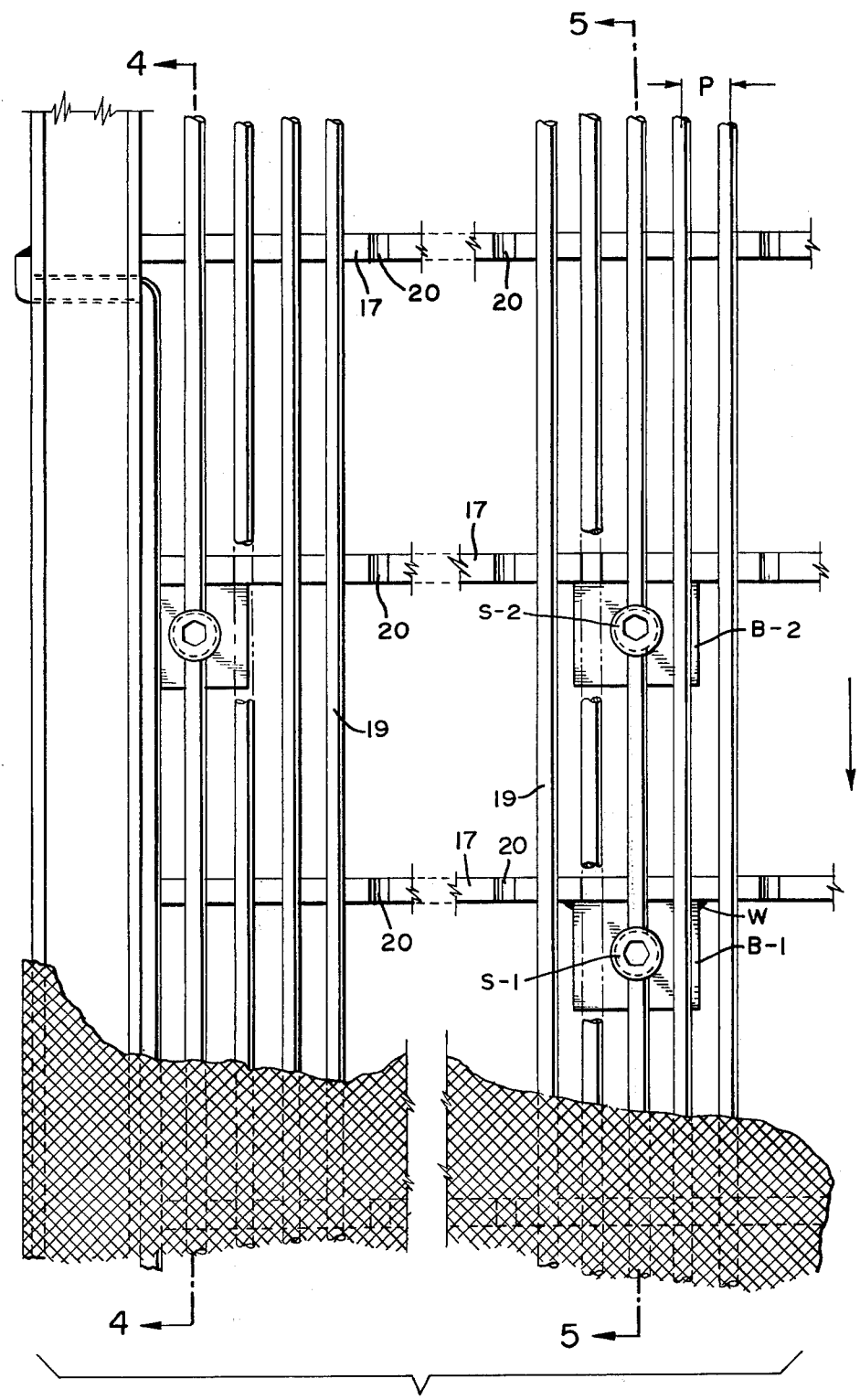
FIG. 3 is a greatly enlarged fragmentary plan view of the filter drum of FIG. 1, showing the terminal anchoring means, as well as one of the intermediate anchoring means.

After one end of the deck wire has been anchored in a single block at point P-1 in the manner shown in FIGS. 1, 3, and 4, the tension winding operation through the intermediate anchoring points P-3 through P-6 may be carried out in the manner illustrated in FIGS. 6, 7, 8 and 9. These Figures show the curvature of the shell 16 of the filter drum, whereas in FIGS. 4, 5, and 5a, the shell, for the sake of simplicity is shown resembling a straight plate.

In the first phase of FIG. 6, with the drum rotated as required by the winding operation in the direction of arrow A-1, the tensioned wire 19 appears in alignment with slots of the two anchoring blocks B-1 and B-2. The rotation of the shell 16 is then stopped to carry out the wire anchoring operation involving the phases shown in FIGS. 7, 8, and 9.

Accordingly, in FIG. 7 the tension wire is depressed by a force indicated by arrow F, into the slots of the two anchoring blocks, in preparation of having the socket type set screws S-1 and S-2 threaded into the respective blocks.

In the next phase shown in FIG. 8, the two set screws have been initially threaded in sufficiently far to allow the wire to be released from the depressing force F.

In the final phase shown in FIG. 9, first the set screw S-1 and then the set screw S-2 are tightened into wire locking position, forming the respective creep-resisting crimps.

Rotation of the shell 16 is then resumed and tension winding of the wire is continued until the next intermediate anchoring point is reached where the foregoing anchoring operation is repeated.

At the end of the winding operation, when the opposite end anchoring point P-2 is reached, the terminal position of the wire is fixed under tension, in a single anchoring block in the manner similar to point P-1.

In summary, it may be seen that this invention provides an anchoring system for a wire-wound deck, of great simplicity and anticreeping effectiveness. This system comprises individual anchoring blocks of great simplicity, disposed in a manner to allow the wire to be wound in a continuous length through a sequence of spaced anchoring points, as the windings align themselves with the slots or sawcuts in the respective anchoring blocks. At the same time, this anchoring system is so arranged as to allow for respective wire sections between anchoring points to be readily replaced in a tension winding operation. By the same token, if the end of a wire supply is reached before the entire winding operation is completed, the end of that supply will be securely anchored in one anchoring block, while the starting end of the new supply will be secured in the adjacent associated anchoring block of an intermediate anchoring point, as illustrated in FIG. 5a.

It will be understood that the invention is not limited to the details of the embodiment herein illustrated, in view of the scope of the underlying concept of the invention, and in view of the scope of the appended claims. For example, the anchoring blocks may be fixed to the shell spaced from the two adjacent ribs. A depression in the bottom of the slot, to cooperate with the set screw for securing the wire in the anchoring block, may be provided in ways other than by the transverse bore.

Therefore, in the example of another embodiment illustrated in FIGS. 11 to 15, an anchoring block 27 is formed with sawcut 28 which partially intersects with a cylindrical bottom recess 29 having a diameter d-3 substantially larger than the diameter d-4 of set screw 30. A wire 31 is depressed into the bottom recess by set screw 30, to form crimp K, the set screw having threaded engagement with the inner sides of sawcut 28 in the manner similar to the embodiment of FIGS. 10, 10a, and 10b.

The block 27 may be fixed or welded to a rib 32 on the drum, as indicated at W-1 in FIG. 15, and also indicated at W in FIG. 3.

Also, two cooperating blocks in series may be located both in the space between a pair of mutually adjacent ribs. Or else, the two blocks may be joined in a single block with the two set screws spaced from one another sufficiently into a single slot, and provision made for cutting the wire between the screws in case a wire section is to be replaced, or a new wire is to be started when the end of the preceding wire has been reached. A sawcut in the block, across the slot intermediate the two screws will allow for that condition.

I claim:

1. In a rotary drum filter, a filter drum which comprises,
   a cylindrical shell,
   a multitude of longitudinally extending outwardly directed ribs provided on said shell spaced from one another about the periphery of said shell,
   deck wire tension wound across said ribs in windings of predetermined pitch as defined by notches formed upon the top edges of the ribs,
   at least one anchoring block for said wire, fixed in relation to said drum, and formed with a slot in the form of a saw cut, and with a depression formed at the bottom of said slot, said saw cut being aligned for receiving said wire while tensioned,
   and a screw threaded into both inner sides of said slot, extending substantially radial to the axis of the drum, and when tightened effective to force the wire into said depression while tensioned, thereby fixedly anchoring the same.

2. The filter drum according to claim 1, wherein said anchoring block is interposed between two mutually adjacent ribs, both ribs having saw cuts registering with said saw cuts in said blocks, for accommodating said wire.

3. The filter drum according to claim 1, wherein said anchoring block has a bore transversely penetrating said slot and arranged and dimensioned so as to form said depression, said slot, said bore, and said set screw being so dimensioned and arranged relative to one another that the tensioned deck wire in the slot becomes fixed by the set screw when tightened sufficiently to force the wire into the depression provided by said bore.

4. The filter drum according to claim 1, wherein said set screw is a socket screw.

5. The filter drum according to claim 1, wherein said anchoring block is fixed to the side of one said rib, said rib having a sawcut registering with the sawcut in said block.

6. The filter drum according to claim 1, wherein said anchoring block is welded to one side of a rib along the vertical corners of the block adjoining said rib, said rib having a sawcut registering with the sawcut in said block.

7. In a rotary drum filter, a filter drum which comprises
   a cylindrical shell,
   a multitude of longitudinally extending outwardly directed ribs provided on said shell spaced from one another about the periphery of said shell,
   deck wire tension-wound, across said ribs in windings of predetermined pitch as defined by notches formed upon the top edges of the ribs,
   at least one pair of anchoring blocks for said wire, as represented by a leading block and a trailing block, spaced a short distance from each other fixed in relation to said drum, each said block formed with a slot in the form of a saw cut, and with a depression at the bottom of said slot, said blocks being arranged in series so that the sawcut of the leading block is aligned with that of the trailing block, for receiving said deck wire while tensioned,
   and a screw for each said anchoring block extending substantially radial to the axis of the drum, each screw being threaded into both inner sides of the slot of a respective block, said screws when tightened being effective to force the wire into said depressions of the anchoring blocks, thereby fixedly anchoring the wire.

8. The filter drum according to claim 7, wherein at least one of said anchoring blocks has a bore transversely penetrating said slot and arranged and dimensioned so as to form said depression,
   said slot, said bore, and said screw being so dimensioned and arranged relative to one another that the deck wire under tension in the slot becomes fixed by the screw being tightened sufficiently to force the wire into the depression provided by said bore.

9. The filter drum according to claim 7, wherein said two anchoring blocks are separated by at least one rib.

10. The filter drum according to claim 7, wherein the first anchoring block is located between two ribs, and the second anchoring block is located between two subsequent ribs, so that said blocks are separated by at least one rib, at least one of said blocks being fixed to one side of a rib, said rib having a sawcut registering with the sawcut of the associated block.

11. The filter drum according to claim 7, wherein the first anchoring block is located between two ribs, and the second anchoring block is located between two subsequent ribs, so that said blocks are separated by at least one rib, each said blocks being fixed to one side of an associated rib, said associated ribs each having a sawcut registering with the sawcut of the associated block.

12. The filter drum according to claim 7, with the addition of a third anchoring block for fixing the trailing end portion of the wire extending rearwardly from said pair of anchoring blocks, said trailing block being formed with a slot in the form of a sawcut, and with a depression at the bottom of said slot, said third block being aligned for receiving said deck wire while tensioned,
   and a screw for each said anchoring block extending substantially radial to the axis of the drum, said screw being threaded into both inner sides of the slot of a respective block, said screws when tightened being effective to force the tensioned wire into said depression of the third block, thereby fixedly anchoring the wire.

13. The drum filter according to claim 7, with the addition of a second pair of anchoring blocks for said wire, as represented by a leading block and a trailing block, fixed in relation to said drum, said first pair and said second pair of blocks defining between them an intermediate section of the deck wire, having a leading and a trailing end portion, each of said second pair of blocks being formed with a slot in the form of a sawcut, and with a depression formed at the bottom of said slot, said second pair of blocks being arranged so that the sawcut of the leading block is aligned with that of the trailing block, for receiving the trailing end portion of said intermediate wire section,
   and a screw for each said anchoring block of the second pair, extending substantially radial to the axis of the drum, each set screw being threaded into both inner sides of the slot of a respective block, said screws when tightened being effective to force the wire into said depressions of said blocks, thereby fixedly anchoring the trailing end portion of said intermediate wire section.

14. In a rotary drum filter, a filter drum which comprises
   a cylindrical shell,
   a multitude of longitudinally extending outwardly directed ribs provided on said shell spaced from one another about the periphery of the shell,
   deck wire tension-wound across said ribs in windings of predetermined pitch defined by notches formed upon the top edges of the ribs,
   a first anchoring block fixed in relation to said drum, said block being formed with a slot in the form of a sawcut, and with a depression formed at the bottom of said slot, said sawcut being aligned for receiving the free trailing end of one section of deck wire while tensioned,
   a screw extending substantially radial to the axis of the drum, said set screw being threaded into both inner sides of said slot and effective when tightened to force said trailing end of the wire into said depression of the block, thereby fixedly anchoring the wire,
   a second anchoring block fixed in series with said first block, and spaced rearwardly therefrom making said first block the leading block and the second block the trailing block of the pair relative to the direction of forward winding rotation of the drum, said second block being constructed and arranged for fixedly anchoring the free starting end of the next subsequent wire section aligned with said trailing end of the deck wire,
   and a third anchoring block fixed in relation to said drum, said block being formed with a slot in the form of a saw cut and with a depression formed at the bottom of said slot, said saw cut being aligned for receiving the trailing end portion of said subsequent wire section while tensioned, and a set screw extending substantially radial to the axis of the drum, said set screw being threaded into both inner sides of said slot, and adopted to be tightened so as to force said wire end portion thus tensioned into said depression in said block.

15. The filter drum according to claim 14, wherein at least one of said first and said third anchoring blocks has a bore transversely penetrating said slot and arranged and dimensioned so as to form said depression, said slot, said bore, and said screw being so dimensioned and arranged relative to one another that the deck wire under tension in the slot becomes fixed by the screw being tightened sufficiently to force the wire into the depression provided by said bore.

16. The filter drum according to claim 14, wherein said first and second anchoring blocks are separated by at least one rib.

17. The filter drum according to claim 14, wherein said first anchoring block and said second anchoring block are separated by at least one rib, at least one of said blocks being fixed to one side of a rib, said rib having a sawcut registering with the sawcut of the associated block.

18. The filter drum according to claim 14, wherein said first anchoring block and said second anchoring block are separated by at least one rib, each said block being fixed to one side of an associated rib, said associated ribs each having a sawcut arranged for accommodating the respective wire.

19. The method of winding the deck wire of a rotary drum filter having longitudinally extending outwardly directed ribs spaced from another about the periphery of the filter drum and wherein the pitch of the wire windings is predetermined by notches formed upon the top edges of the ribs, which method comprises, anchoring the initial end portion of the wire at one end of said cylindrical body, winding the wire under controlled tension by rotating said body to a predetermined number of windings to be formed to constitute a first winding section, stopping the rotation of the drum at the end portion of said first winding section, while maintaining tension of the wire, establishing a first anchoring point for removably fixing a first point of said end portion, secured against slippage relative to said drum, while maintaining tension on the wire, establishing a second anchoring point for removably fixing a second point of the wire spaced rearwardly a short distance from said first point, secured against slippage relative to said drum, while maintaining tension on the wire, continuing the wire winding operation under tension, and similarly anchoring said wire through similar pairs of anchoring points, thus defining similar tension-wound wire sections between respective pairs of anchoring points, and replacing any one said wire section, which comprises detaching the end portions of said section from their respective leading and trailing ends thereof, fixing the starting end of a replacement wire at the vacated leading anchoring point, tension winding the replacement wire until reaching the vacated trailing anchoring point, and while maintaining tension securing said wire at said trailing anchoring point.

* * * * *